F. J. GABEL.
INSECT TRAP.
APPLICATION FILED JUNE 9, 1913.
1,085,329.
Patented Jan. 27, 1914.
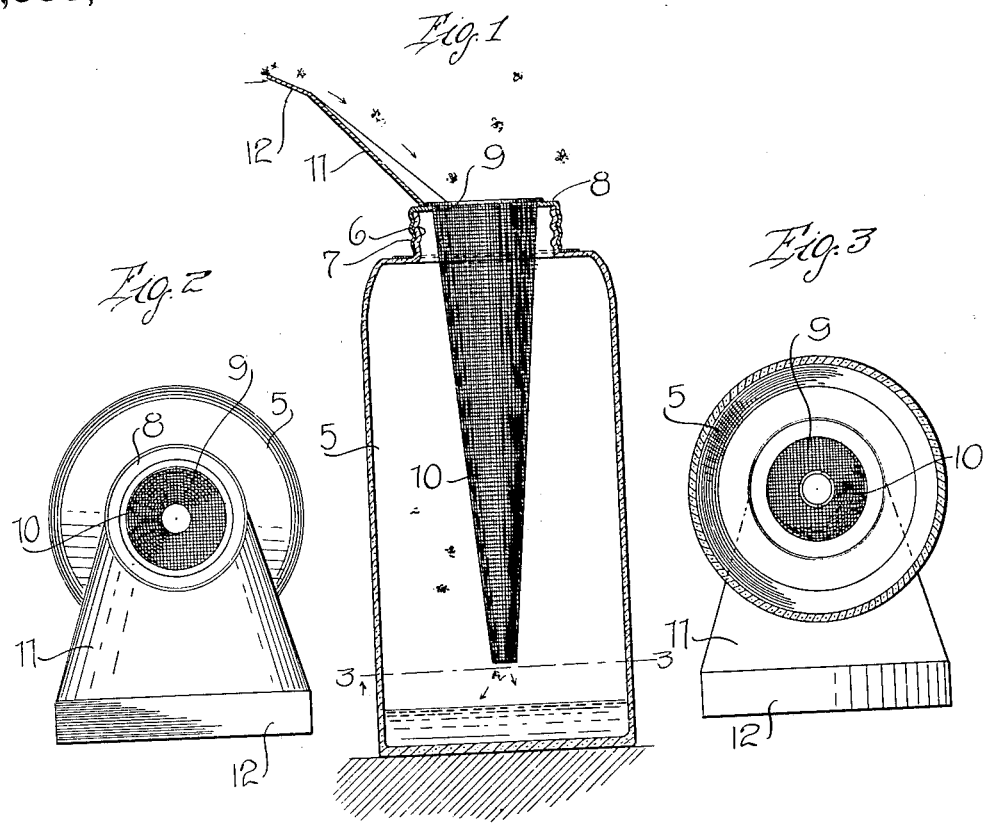
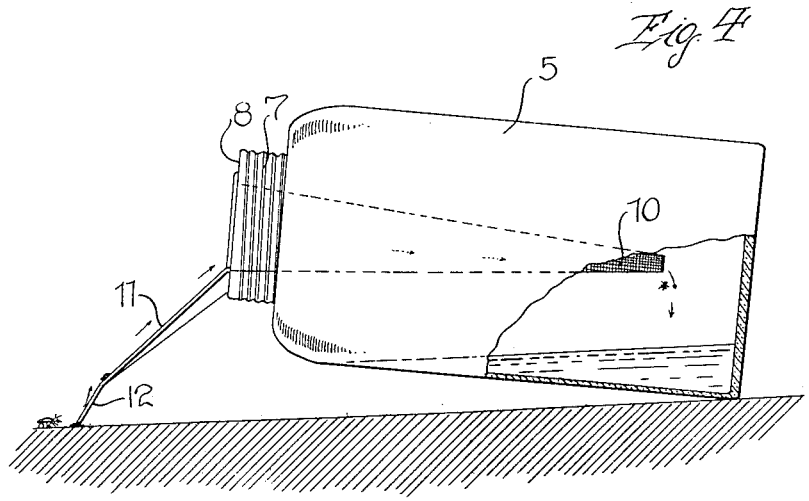
Inventor
F. J. GABEL
Witnesses
Robert M. Sutphen
A. I. Hind
By Watson E. Coleman
Attorney

UNITED STATES PATENT OFFICE.

FRED J. GABEL, OF YALE, SOUTH DAKOTA.

INSECT-TRAP.

1,085,329.

Specification of Letters Patent.

Patented Jan. 27, 1914.

Application filed June 9, 1913. Serial No. 772,719.

*To all whom it may concern:*

Be it known that I, FRED J. GABEL, a citizen of the United States, residing at Yale, in the county of Beadle and State of South Dakota, have invented certain new and useful Improvements in Insect-Traps, of which the following is a specification, reference being had to the accompanying drawings.

This invention relates to improvements in insect traps, and an object thereof is the provision of trap mechanism which is applicable to any fruit jar of standard make.

A further object of this invention is the provision of a trap comprising a receptacle having a cover, the cover having a central opening therein and also having an open ended cone-shaped member connected thereto in alinement with the opening which projects within the receptacle.

Another object of this invention is the provision of a trap consisting of a receptacle having a closure cap, the cap being provided with a central opening and having an inverted cone connected to the inner face thereof in alinement with the opening which projects within the receptacle, the cap also having an outwardly and laterally extending plate projecting therefrom, the free edge of the plate being straight whereby the receptacle may be supported in a horizontal position.

With these and other objects in view, my invention consists in the novel construction, combination and arrangement of parts, to be hereinafter more fully described, claimed and illustrated in the accompanying drawing, in which—

Figure 1 is a longitudinal section of the trap; Fig. 2 is a top plan view thereof; Fig. 3 is a section on the line 3—3 of Fig. 1, looking in the direction of the arrow; and Fig. 4 is an elevation partly in section showing the trap used in horizontal position.

Referring more particularly to the drawing, the numeral 5 designates a receptacle which is preferably a fruit jar of standard make, the jar having a threaded neck 6 formed thereon which is adapted for threaded connection with the flange 7 of a cap 8. The cap 8 is provided with a central opening 9 and connected to the wall of the opening is an inverted cone 10 which is constructed of wire mesh, or other similar material. Connected to one side of the outer face of the cap 8, is an outwardly and laterally extending plate 11, the same being arcuate in transverse section and flaring outwardly toward the outer end thereof. The extreme outer end of this plate is flat and offset outwardly, as shown at 12, the purpose of which will be hereinafter and more particularly set forth.

When the device is used as a trap for flying insects, the jar may be disposed in a vertical position, and a quantity of molasses or other similar bait may be disposed therein. When the cap 8 is connected to the jar in the usual manner, the cone 10 projects within the jar, and the member 11 serves as an alighting plate upon which flying insects may alight prior to entering the jar through the cone 10. It will be seen that the insects that enter the jar through the cone 10 are prevented from escaping therefrom by reason of the restricted inner end of the cone. When the device is used as a trap for crawling insects, the jar is disposed in a substantially horizontal position, so that the free straight edge of the plate 11 rests upon the ground or other support provided for the trap, and it will be seen that in this position, the open end of the jar is elevated slightly from the support, so that the molasses or other bait contained therein is prevented from passing out of the jar through the opening in the cap. The plate 11 also serves as a runway for the insects so that they may readily enter the enlarged outer end of the cone.

From the above description taken in connection with the accompanying drawing, it will be seen that I have provided a trap which may be utilized for trapping either flying or crawling insects, and one in which the trap mechanism may be readily connected to any fruit jar of standard make.

What I claim is:

1. In an insect trap, the combination with a receptacle; of a cap member removably engaged with the opening in said receptacle, said cap member being also provided with a central opening, a hollow inverted cone-shaped member secured at its upper end to said cap member surrounding the opening therein, said inverted cone-shaped member being disposed within the receptacle and having an opening at its lower end, and an outwardly and upwardly inclined plate secured to the outer face of said cap member at a point contiguous with the opening therein, said plate being arcuate in transverse section and flaring outwardly toward its outer end, the extreme outer end of said plate being flat and offset outwardly.

2. In an insect trap, the combination with a receptacle; of a cap member removably engaged with the open end thereof and provided with an enlarged opening registering with the opening of the receptacle, a hollow member of inverted cone-shaped design secured at its upper end to said cap member surrounding the opening therein and depending within the receptacle, said inverted cone-shaped member being formed of foraminous material and provided with an opening at its lower end, an opaque plate member secured to the outer face of the cap member contiguous with the opening therein and extending at an inclination upwardly and outwardly therefrom to a plane beyond the wall of the receptacle, said plate member being arcuate in transverse section and flaring outwardly toward its outer end, the extreme outer end of said plate being flat and offset outwardly.

In testimony whereof I hereunto affix my signature in the presence of two witnesses.

FRED J. GABEL.

Witnesses:
E. J. KLUDT,
J. D. KAUFMAN.